US008051088B1

(12) United States Patent
Tibbetts et al.

(10) Patent No.: US 8,051,088 B1
(45) Date of Patent: Nov. 1, 2011

(54) DOCUMENT ANALYSIS

(75) Inventors: Timothy A. Tibbetts, Renton, WA (US);
Debra A. Rigdon, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/756,057

(22) Filed: Apr. 7, 2010

(51) Int. Cl.
*G06F 7/00* (2006.01)
(52) U.S. Cl. ........ 707/749; 707/708; 707/755; 707/636; 707/655; 707/825; 709/217; 715/229; 704/7
(58) Field of Classification Search .................. 707/708, 707/749
See application file for complete search history.

(56) References Cited

U.S. PATENT DOCUMENTS

| | | | |
|---|---|---|---|
| 2004/0059736 A1 | 3/2004 | Willse et al. | |
| 2009/0049032 A1* | 2/2009 | Maghoul et al. | 707/5 |
| 2009/0138826 A1* | 5/2009 | Barros | 715/841 |
| 2009/0210388 A1* | 8/2009 | Elson et al. | 707/3 |

OTHER PUBLICATIONS

Schrodt, Automated Coding of International Event Data Using Sparse Parsing Techniques, presented at the International Studies Association, Chicago, Feb. 2001.
Manku et al., Detecting Near-Duplicates for Web Crawling, International World Wide Web Conference Committee (IW3C2), Banff, Alberta, Canada, May 2007.
Gamon et al., BLEWS: Using Blogs to Provide Context for News Articles, Association for the Advancement of Artificial Intelligence, www.aaai.org, 2008.
Hoeglinger et al., io-port.net Database, io-port 05547122, CBDT: A concept based approach to data stream mining, FIZ Karlsruhe, Feb. 4, 2010.
Dan et al, Scalable Web Mining With Newistic, Inholland University, Diemen, The Netherlands, Imperial College, London, United Kingdom.
Qian et al., io-port.net Database, io-port 05547097, Simultaneously finding fundamental articles and new topics using a community tracking method, FIZ Karlsruhe, 2010.
Zadeh, From Computing With Numbers to Computing With Words—From Manipulation of Measurements to Manipulation of Perceptions, Int. J. Appl. Math. Comput., 2002.
Leskovec et al., Meme-tracking and the Dynamics of the News Cycle, KDD '09, Paris, France, 2009.

* cited by examiner

*Primary Examiner* — Shahid Alam
*Assistant Examiner* — Fazlul Quader
(74) *Attorney, Agent, or Firm* — Toler Law Group

(57) ABSTRACT

A particular computer-implemented method includes generating a plurality of intent maps based on a plurality of documents. The plurality of intent maps includes a first intent map based on a first document and a second intent map based on a second document. Each intent map of the plurality of intent maps corresponds to a document of the plurality of documents and includes a set of event structures. Each event structure includes data descriptive of an actor and an action described in the document that corresponds to the intent map. The method also includes performing a comparison of event structures of the first intent map and event structures of the second intent map. The method further includes determining, based on the comparison, whether at least a portion of the first document is duplicative of at least a portion of the second document.

20 Claims, 4 Drawing Sheets

DOCUMENT ANALYSIS

FIELD OF THE DISCLOSURE

The present disclosure is generally related to analyzing documents.

BACKGROUND

Some types of document processing examine documents and perform evaluations based on information contained in the documents. For example, automated systems that evaluate information for intelligence gathering, forensic analysis and predictive analysis may examine documents to gather and analyze the information. Some automated system may treat recurrences of information (e.g., repetition of information in two or more different documents) as confirmation or additional evidence of reliability of the information. However, in some situations, repetition of the information may not provide additional evidence of reliability of the information. For example, a second document may use a first document as a source. In this case, the second document may not include any information that is independent of the first document, but rather is merely repeating information from the first document. In this situation, an automated system may falsely conclude that the information repeated from the first document in the second document has more support than would be the case if the interdependence of the documents were recognized.

SUMMARY

Document analysis methods to automatically determine whether a specific piece of information is unique within a set of documents or whether the information is duplicated or paraphrased from another document are described herein. After the unique pieces of information from a set of documents have been identified, data identifying the unique pieces of information can be used for other analysis purposes. In a particular embodiment, a computer-implemented method is used to analyze documents. A set of documents may be analyzed to identify unique events or information. For example, intent maps corresponding to the documents may be generated and compared to one another. Each intent map corresponds to a document and includes one or more event structures. An event structure includes data descriptive of an event described in a sentence of the corresponding document. For example, the event structure may include an actor and an action described in the sentence, with an ascribed intent associated with the actor-action pair.

After intent maps have been determined for two or more documents, the documents may be evaluated by comparing the intent maps. For example, a set of event structures from the first intent map may be compared to a set of event structures from the second intent map to determine whether the first document and the second document are duplicative. Duplicative documents may have more than a threshold number of events structures in common.

To illustrate, a particular computer-implemented method includes generating a plurality of intent maps based on a plurality of documents. The plurality of intent maps includes a first intent map based on a first document and a second intent map based on a second document. Each intent map of the plurality of intent maps corresponds to a document of the plurality of documents and includes a set of event structures. Each event structure includes data descriptive of an actor and an action described in the document that corresponds to the intent map. The method also includes performing a comparison of at least one event structure of the first intent map and at least one event structure of the second intent map. The method further includes determining, based on the comparison, whether at least a portion of the first document is duplicative of at least a portion of the second document. The method further includes determining, based on the comparison, whether at least a portion of the second document includes new (not previously seen) information not contained in the first document.

In another illustrative embodiment, a computer-readable storage medium includes instructions that, when executed by a processor, cause the processor to generate a plurality of intent maps based on a plurality of documents. The plurality of intent maps includes a first intent map based on a first document and a second intent map based on a second document. Each intent map of the plurality of intent maps corresponds to a document of the plurality of documents and includes a set of event structures. Each event structure includes data descriptive of an actor and an action described in the document that corresponds to the intent map. The computer-readable storage medium also includes instructions that, when executed by the processor, cause the processor to perform a comparison of event structures of the first intent map and event structures of the second intent map. The computer-readable storage medium further includes instructions that, when executed by the processor, cause the processor to determine, based on the comparison, whether at least a portion of the first document is duplicative of at least a portion of the second document.

In still another illustrative embodiment, a system includes a processor and a memory device that is accessible to the processor. The memory device includes instructions that, when executed by the processor, cause the processor to generate a plurality of intent maps based on a plurality of documents. The plurality of intent maps includes a first intent map based on a first document and a second intent map based on a second document. Each intent map of the plurality of intent maps corresponds to a document of the plurality of documents and includes a set of event structures. Each event structure includes data descriptive of an actor and an action described in the document that corresponds to the intent map. The memory device includes instructions that, when executed by the processor, cause the processor to perform a comparison of event structures of the first intent map and event structures of the second intent map. The memory device also includes instructions that, when executed by the processor, cause the processor to determine, based on the comparison, whether at least a portion of the first document is duplicative of at least a portion of the second document.

The features, functions, and advantages described can be achieved independently in various embodiments or may be combined in yet other embodiments, further details of which are disclosed with reference to the following description and drawings.

DETAILED DESCRIPTION

Figure 1:
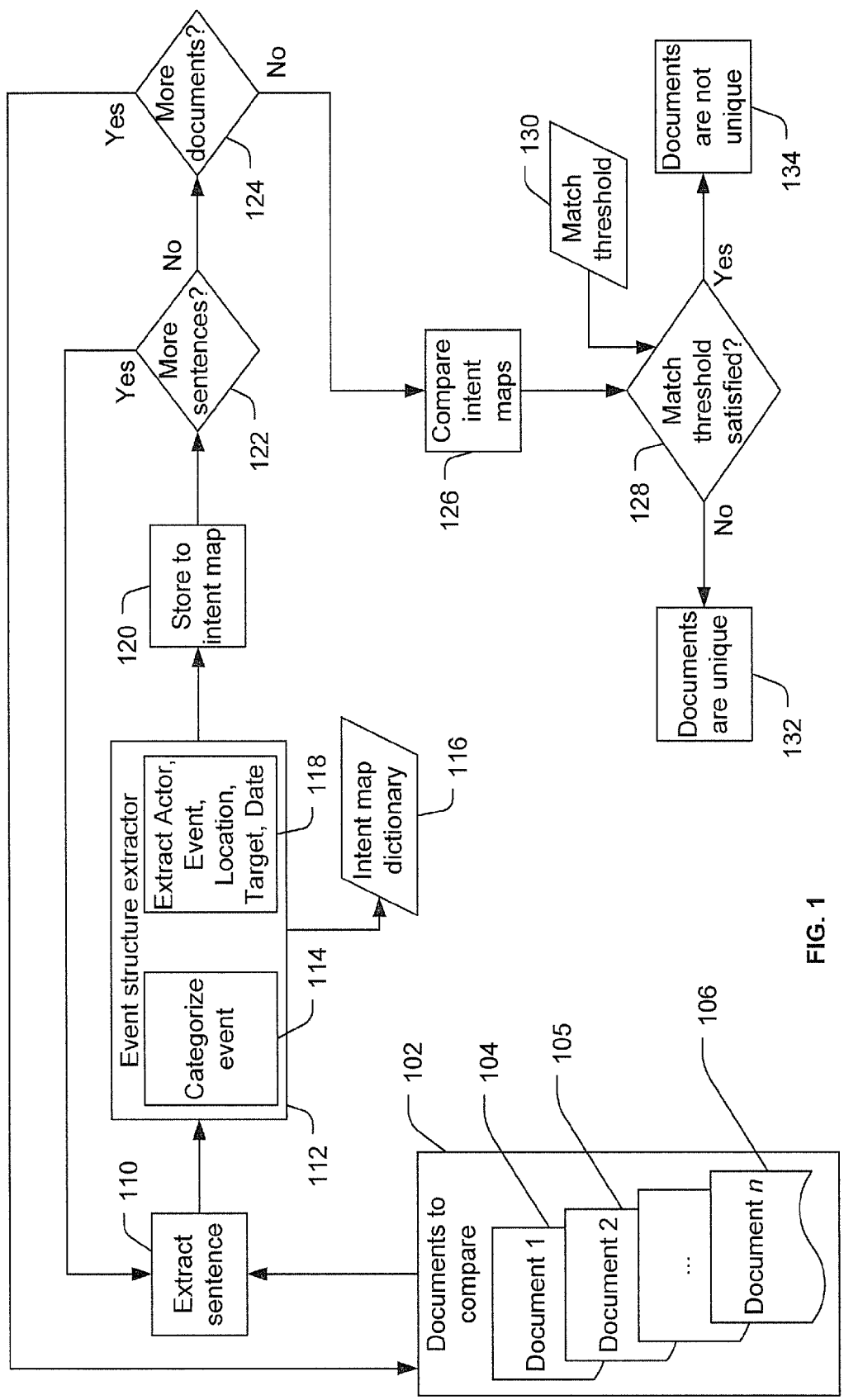
FIG. 1 is a flow diagram of a first particular embodiment of a method of analyzing documents.

Document analysis methods described herein may be able to automatically determine whether a specific piece of information is unique within a set of documents or whether the information is duplicated or paraphrased from another document. After the unique pieces of information from a set of documents have been identified, data identifying the unique pieces of information can be used for other analysis purposes. For example, automated information fusion and analysis tools may use the unique pieces of information or the data identifying the unique pieces of information for analysis purposes. Examples of automated information fusion and analysis tools include tools that automatically evaluate threats or gather intelligence information; tools that perform forensic analysis, predictive analysis, data mining, or information fusion; other data processing tools that benefit from using unique pieces of information or from knowing whether information is unique among a set of documents; or any combination thereof. To illustrate, an automatic threat evaluation tool may use the data identifying the unique pieces of information to determine whether information provided from a particular document is duplicate evidence or is new or confirming evidence (e.g., independent confirmation of an event), which may enable the automatic threat evaluation tool to adjust the weight given to the evidence.

In a particular embodiment, a computer-implemented method is used to analyze documents. A set of documents may be analyzed to identify unique events or information, i.e., events or information that is not found in other documents within a set of documents. In particular, a set of documents may be analyzed to generate intent maps based on the documents. Each intent map may correspond to a document. For example, a first intent map may correspond to a first document and a second intent map may correspond to a second document. The intent maps each include one or more event structures. An event structure may be a data record that includes data descriptive of an event described in a sentence of the document that corresponds to the intent map. For example, the event structure may include an actor and an action described in the sentence.

After intent maps have been determined for two or more documents, the documents may be evaluated by comparing the intent maps. For example, a set of event structures from the first intent map may be compared to a set of event structures from the second intent map to determine whether the first document and the second document are duplicative. Duplicative documents may have more than a threshold number of events structures in common. To illustrate, many news sources may publish a story that was originally generated by a single news agency. That is, secondary news sources may publish wire stories, e.g., articles that were first generated by another news agency. In some instances, many news sources may republish or paraphrase a particular wire story. Thus, when news articles from these news sources are collected as documents for analysis by an automated information fusion and analysis tool, it may at first appear that many separate news sources are confirming events described in the wire story. However, since all of these republished and paraphrased news articles rely on a single source (the wire story), it may be more appropriate to determine that only one of the documents including the news articles describes a unique set of events. That is, the documents other than the original wire story are merely duplicative, describing the same events based on the same source document.

Certain automated information fusion and analysis tools may weight information based on how much data is available to confirm the information. Thus, if duplicative documents are not identified, these automated information fusion and analysis tools may behave as though more data confirming the information is available than is actually the case. For example, the automated information fusion and analysis tools may treat each of the news articles republishing or paraphrasing the wire store as a separate confirmation of events described in the wire story.

Further, certain automated information fusion and analysis tools may place additional weight on information derived from particular sources that are considered to be reliable. Major news sources may be among the sources that are considered to be reliable. For example, information derived from a news articles published by a major news source may be considered to be more reliable than information derived from an anonymous or unknown online source, such as a blog entry from an unknown individual. Major news sources may be more likely to publish a wire story than an anonymous or unknown source would be. However, being republished by a major news source may not actually be an indication of credibility or reliability of the events described in the wire story unless the major news source has independently verified the events. Thus, events described in wire stories may be treated as more credible than they should be due to: 1) being republished and paraphrased repeatedly and 2) being published by "reliable" sources.

Simple efforts to automatically determine uniqueness, such as computing a simple checksum or edit-distance between two documents, may not be effective. For example, a search of an online news service may return multiple articles. These articles may appear to share some commonality, at least at a keyword level, since they were both identified in response to the search. However, since a search does not address concepts, many articles listed in the search results may not appear relevant. Additionally, of the hundreds of articles returned in response to the search, the relevant articles may originate from only a few different sources. A simple checksum or keyword comparison may indicate that the articles are from different sources. However, a closer analysis may reveal that the articles likely share a common source. Document analysis systems and methods disclosed herein may automatically determine that the articles are duplicative.

FIG. 1 is a flow diagram of a first particular embodiment of a method of analyzing documents. A set of documents 102 to be compared is selected. For purposes of illustration, the set of documents 102 is shown as including a first document 104, a second document 105, and one or more additional documents 106. In a particular embodiment, the documents 104-106 may include or be derived from any text-based information sources or any other information source that can be converted into a text-based information source (e.g., using a speech-to-text process). For example, the documents 104-106 may include text from print or online sources, transcripts of broadcasts (e.g., radio, television or telephone sources), other communications (e.g., personal communications via letters or electronic mail), or any combination thereof.

To begin analyzing the set of documents 102, the first document 104 may be selected for processing. The first document 104 may be parsed to identify sentences. A first sentence may be extracted, at 110, and provided to an event structure extractor 112. The event structure extractor 112 may categorize one or more events described in the first sentence, at 114. The event structure extractor 112 may be adapted to generate one or more event structures based on the sentence. For example, the event structure extractor 112 may include software such as the TABARI Automated Event Coding System, an open-source event coding program developed by Phillip Schrodt, et al. of the University of Kansas and distributed under the GNU General Public License. A manual describing operation of the TABARI Automated Event Coding System by Phillip Schrodt, entitled "TABARI. Textual Analysis by Augmented Replacement Instructions Version 0.7" and published Jul. 1, 2009, provides a description of generating event structures (also called automated event coding) and is incorporated herein by reference in it entirety for all purposes.

The event structure extractor 112 may generate one or more event structures based on the sentence being analyzed, also referred to as "coding the sentence." In a particular embodiment, the event structure extractor 112 may use a sparse parsing technique. Sparse parsing refers to processing only portions of a sentence rather than parsing the sentence fully. For example, only the portions of the sentence that will be used to generate event structures, e.g., nouns and verbs that are identified in the intent map dictionary 116, may be processed. In another example, time based words may also be processed to determine whether the time based words can be linked to an absolute time or date. Additionally or in the alternative, pronouns may be processed to determine whether each pronoun can be linked to an antecedent noun.

To code a sentence, the event structure extractor 112 may perform a series of operations, including lexical processing, syntactic processing, and coding. In a particular embodiment, lexical processing includes searching for proper nouns by identifying words that begin with an upper-case letter other than a first word of the sentence. Text of the sentence may then be converted to a standard format. In a particular embodiment, in the standard format all letters are upper-case and punctuation except for commas is removed. Individual words of the text are compared to the intent map dictionary 116 to identify words of interests (e.g., actors, actions, targets, locations, etc.). When a word that is found in the intent map dictionary 116 is identified, a code from the intent map dictionary 116 that corresponds to the word may be stored in an event structure for the sentence. A word type code may also be assigned to one or more words of the sentence. The word type code may identify the words as a verb, a pronoun, a conjunction, a noun (which may be either an actor or a target), a number, a time-based word, another type of term of interest or part of speech, or any combination thereof.

In a particular embodiment, syntactic processing includes evaluating the sentence to determine whether to process the sentence further. For example, sentences that are too complex or that do not include actors or actions of interest (i.e., actors or actions identified in the intent map dictionary 116) may be discarded or set aside for evaluation by a human analyst. To illustrate, sentences that include more than a predetermined number of potential actors (e.g., nouns or noun phrases) or more than a predetermined number of potential actions (e.g., verbs or verb phrases) may be set aside. In another example, sentences for which no potential actor, action or location can be identified may be set aside.

In a particular embodiment, evaluation of a sentence may cease if the sentence is found to include a stop term or stop phrase identified in the intent map dictionary 116. To illustrate, the documents 102 may include news articles that are being analyzed to evaluate information descriptive of a particular set of political events between two countries. If sports teams from the two countries have recently played each other, the documents 102 may also include articles related to the sports teams, which may not be considered relevant to the analysis. Accordingly, sports related terms or names of the sports teams may be included in the intent map dictionary 116 as stop terms that may cause processing of a sentence or a document including a stop term to cease.

The syntactic processing may also include locating noun and verb phrases in the sentence. The noun or verb phrases may be located based on the intent map dictionary 116. For example, the intent map dictionary 116 may include phrases or sets of words that are considered synonymous with a particular actor. To illustrate, for a particular time period, the terms "President of the United States" and "George Washington" may be considered synonyms. Similarly, other terms that refer to a U.S. President, such as "U.S. President", "President Washington", and so forth, may be considered synonyms for the same actor. All occurrences of these synonymous terms may be replaced by a single term or code that corresponds to the particular actor. In another example, the intent map dictionary 116 may identify actions that are considered synonymous with or indicative of a particular intent. To illustrate, the intent map dictionary 116 may map the terms "greeted" and "welcomed" to the intent "received". Thus, the sentence "Bob greeted Sam" and the sentence "Bob welcomed Sam" may both reflect the intent that Bob received Sam. The actors, locations, actions and time based words, or any combination thereof, may be replaced with a term or code that corresponds to a set of synonyms. Certain terms may be either nouns or verbs depending on context. Accordingly, locating the noun and verb phrases may include disambiguation of some terms. To illustrate, the sentence may be examined for articles (e.g., "a," "an," and "the") appearing before a particular term to determine whether the term is a noun or not.

In a particular embodiment, the syntactic processing may include determining an antecedent of a pronoun that appears in the sentence. For example, the pronouns "he," "she," and "it" (or their possessives) may be assumed to refer to a first actor indentified in a sentence. Plural pronouns (e.g., "they") may be assumed to refer to plural nouns (e.g., nouns that end in "s" or that are associated with a group based on the intent map dictionary 116). In another example, the antecedent may be identified using semantic information. To illustrate, in the sentence, "John took the cake home and ate it." Semantic information may be used to determine that the pronoun "it" refers to "cake" rather than "home" since one does not eat a home.

The syntactic processing may also include discarding comma delimited clauses and breaking up compound sentences, compound subjects and compound predicates into multiple event structures. For example, the sentence "John and Mary ate cake" may be divided into an event structure corresponding to "John ate cake" and an event structure corresponding to "Mary ate cake." In another example, the sentence "John ate cake and pie" may be divided into an event structure corresponding to "John ate cake" and an event structure corresponding to "John ate pie." In still another example, the sentence "John bought a cake and baked a pie" may be divided into an event structure corresponding to "John bought a cake" and an event structure corresponding to "John baked a pie." In a particular embodiment, when a sentence includes multiple actors, actions, locations, targets, time-based words, or any combination thereof, multiple event structures may be generated, where each event structure corresponds to just one actor, one action, one location, one target, and one time or date.

In a particular embodiment, the syntactic processing includes determining symmetric event structures. Symmetric event structures may occur when one actor performing an action toward a target requires that the target perform a symmetric action with respect to the actor. To illustrate, when a first party meets a second party, the second party also meets the first party. Thus, symmetric event structures may be generated: a first event structure that indicates that the first party met the second party, and a second event structure that indicates that the second party met the first party. Symmetric actions may be identified based on symmetric action pairs identified in the intent map dictionary 116.

In a particular embodiment, event coding evaluates each verb in the sentence and attempts to match phrases associated with that verb to terms in the intent map dictionary 116 using patterns specified in the intent map dictionary 116. When a verb phrase listed in the intent map dictionary 116 is identified, an actor and a target associated with the verb phase are identified to generate an event structure corresponding to the sentence.

In a particular embodiment, the intent map dictionary 116 includes one or more data files (such as ASCII files). The data files may identify terms that are of interest (e.g., actions, actors, targets, location, time-based words, pronouns, conjunctions) and information related to processing of the terms. For example, a term may be associated with a code or synonym that is to be used in place of the term in event structures. Terms in the intent map dictionary 116 may include individual words, word stems, phrases, word patterns, or combinations thereof. A phrase refers to a set of words that appear together, whereas a pattern includes a set of words that may appear with one or more intervening words.

In a particular embodiment, the intent map dictionary 116 includes information that specifies how a particular word in a sentence is to be processed. To illustrate, the intent map dictionary 116 may include information that sets priorities for particular verbs. For example, a priority may be set to subordinate a particular verb such that the particular verb is used as an action in an event structure when no other verb is found in the sentence corresponding to the event structure. Thus, a priority may be set to subordinate the verb "said." The word said may be used frequently in news articles to denote a quotation. It may be desired to generate event structures based on actions within the quotations rather than based on an actor stating the quoted information. In this situation, the verb said may be subordinated so that actions described in the quotation are preferred to generate event structures.

After coding the sentence, the event structure extractor 112 may store the event structure or event structures corresponding to the sentence to an intent map associated with the first document, at 120. At 122, a determination is made whether the first document 104 includes more sentences. When the first document 104 includes more sentences to be processed, the method returns to 110 to extract a subsequent sentence. If the first document 104 does not include more sentences to be processed, the method proceeds to 124 where a determination is made whether more documents are to be processed. When there are more documents in the set of documents 102 to be processed, the method may select a subsequent document from the set of documents 102 and begin extracting sentences from the subsequent document, at 110. When there are no more documents to be processed, the method may compare intent maps corresponding to the documents, at 126.

In a particular embodiment, the intent maps are compared to each other to determine whether documents are duplicative. For example, a first intent map corresponding to the first document 104 may be compared to a second intent map corresponding to the second document 105. To illustrate, each event structure of the first intent map may be compared to each event structure of the second intent map. In another illustrative example, a subset or selected portion of the event structures of the first and second intent maps may be compared to one another. As described above, the intent maps include event structures, and each event structure corresponds to a single actor and a single action. An event structure may also include a single target, a single location, a single time or any combination thereof. Thus, a first event structure corresponding to an event described in the first document 104 and a second event structure corresponding to a second event described in the second document 105 may be compared by determining whether the actor and action match between the first event structure and the second event structure. Additionally, if the event structures include other data, such as targets, locations, times, etc., the other data may also be compared. To illustrate, consider a first sentence from the first document 104 that states, "John was at home Thursday and baked a cake." Also consider a set of sentences from the second document 105 that states, "The cake that John baked last week while he was at home was very good." The first sentence may be analyzed to determine a first event structure, such as actor=John, action=bake, and target=cake. Additionally, the intent map dictionary 116 may include information that specifies that John's home is at a particular address, e.g., John's home address. Alternately, the intent map dictionary 116 may include information that indicates that John's home address should be accessed from another source, entered by a human analyst, or indicated by a place holder, such as "home." Also, based on other information in the first document, the event structure extractor 112 may determine that Thursday is a reference to a particular date, such as Thursday, Jan. 7, 2010. Thus, the first event structure may include: actor=John, action=bake, target=cake, location=John's home address, time/date=Thursday, Jan. 7, 2010. The second event structure may include actor=John, action=bake and target=cake. Thus, when the comparison is only based on the actor, action and target, the first event structure and the second event structure may be considered a match. The second event structure may also include the location=John's home address since the sentence indicates that this is where John baked the cake. Based on other information in the second document, the event structure extractor 112 may determine that "last week" refers to the week of Jan. 3, 2010 to Jan. 9, 2010. Thus, the second event structure may include actor=John, action=bake, target=cake, location=John's home address, time/date=Jan. 3, 2010-Jan. 9, 2010. When the location and time are considered in the comparison, the date range from the second event structure may be determined to include the date specified in the first event structure. Thus, the first and second event structures may be considered a match.

Based on comparing the intent maps, a number of matching event structures may be determined. The number of matching event structures may indicate how many of the event structures of the first intent map match event structures of the second intent map. In a particular embodiment, the number of matching event structures is a count, e.g., a tally, of the number of matching event structures of one of the intent maps or of the number of matching event structures of two or more intent maps that are being compared. In another embodiment, the number of matching event structures is represented as a relative value, e.g., a percentage of event structures that are matching from one of the intent maps or a percentage of event structures that are matching from among two or more intent maps that are being compared.

At 128, a determination is made whether a match threshold 130 is satisfied by the number of matching event structures. The match threshold 130 may be used as a criterion for determining whether two documents match one another (i.e., are duplicative) or do not match one another (i.e., are not duplicative). For example, the match threshold 130 may indicate that when at least a particular percentage of event structures match between two documents, the two documents are to be considered duplicative of one another.

In a particular embodiment, a particular document may be compared to an existing set of intent maps. For example, after a set of documents are used to generate a set of intent maps, a new document may be received for analysis. The new document may be compared to the intent maps that were previously generated. In this embodiment, the particular document may be processed as previously described to generate an intent map corresponding to the particular document. For example, the particular document may be parsed to identify sentences. The sentences may be extracted and provided to the event structure extractor 112. A set of event structures may be extracted based on the document to form the intent map corresponding to the particular document. The intent map of the particular document may be compared to one or more predetermined intent maps to determine whether the particular document is duplicative of another document that corresponds to one of the predetermined intent maps.

In another particular embodiment, the one or more predetermined intent maps include unique event structures. The unique event structures may include only a single instance of a particular event structure no matter how many different documents include text that would generate the particular event structure. That is, if two documents describe an event and would generate the same event structure, only one instance of the event structure is included in the set of unique event structures. The particular document may be compared to the one or more predetermined intent maps that include the set of unique event structures. The particular document may be processed as previously described to generate an intent map corresponding to the particular document. That is, the particular document may be parsed to identify sentences and the sentences may be extracted and provided to the event structure extractor 112. A set of event structures may be extracted based on the document to form the intent map corresponding to the particular document. The intent map of the particular document may be compared to one or more predetermined intent maps that include the set of unique event structures to determine whether new event structures are described in the particular document. When new event structures are identified, the new event structures may be added to the set of unique event structures. Thus, events that have not been described by other documents can be identified. The unique event structures may be provided for further analysis by an automated information fusion and analysis tool or by a human analyst, which may reduce processing of duplicate information.

Figure 2:
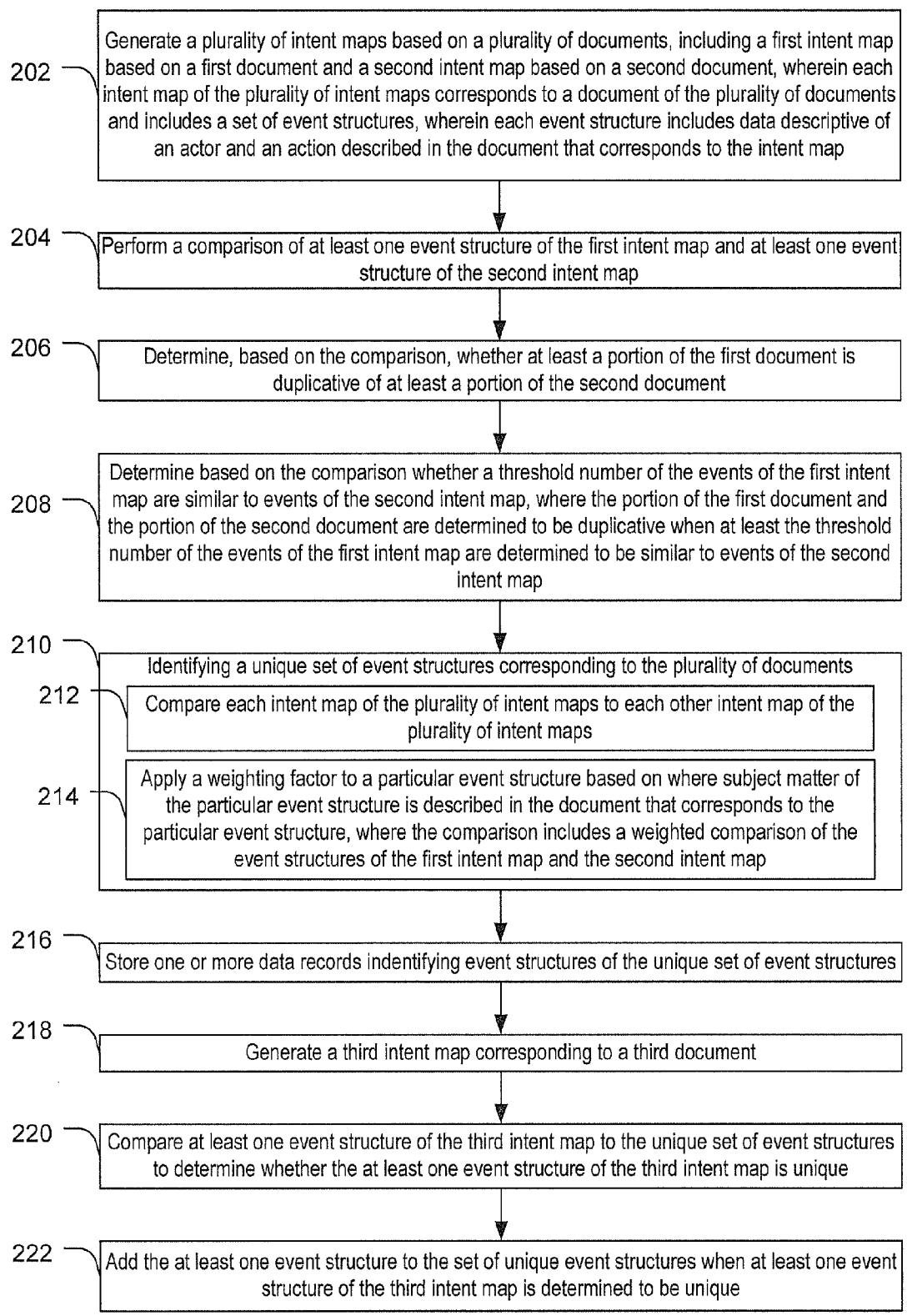
FIG. 2 is a flow diagram of a second particular embodiment of a method of analyzing documents.

FIG. 2 is a flow diagram of a second particular embodiment of a method of analyzing documents. The method includes, at 202, generating a plurality of intent maps based on a plurality of documents. For example, the intent maps may be prepared by an event structure extractor, such as the event structure extractor 112 of FIG. 1. Each intent map of the plurality of intent maps corresponds to a document of the plurality of documents and includes a set of event structures. Each intent map may be associated with the corresponding document or a portion of the corresponding document. For example, the plurality of intent maps may include a first intent map based on all or a portion of a first document and a second intent map based on all or a portion of a second document.

An event structure may include data descriptive of an actor and an action (or an intent associated with the action) described in a document that corresponds to the intent map. The event structure may also include other data, such as data descriptive of a target of the action, a time, a date, a location of the action, or any combination thereof. The actor refers to a party performing the action and the target refers to a party that is an object of the action. The intent refers to a term or code that is associated with a set of verbs or verb phrases that are synonymous or similar in meaning. In a particular embodiment, each sentence of the document may be analyzed to determine the event structures. Each event structure may correspond to a particular sentence of the document; however, each sentence of the document may not be used to generate an event structure. For example, an intent map dictionary may be used to generate the plurality of intent maps. The intent map dictionary may include a list or other data structure that identifies terms of interest. To illustrate, the intent map dictionary may include a list of actors, actions, intents, targets, locations, or other terms that are of interest in generating the plurality of intent maps. In one embodiment, only sentences that pertain to terms in the intent map dictionary may be used to generate event structures. Alternately or in addition, only sentences that have a suitable sentence structure may be used to generate event structures. For example, certain sentences in a document may have a structure that is too complex or too simple to be automatically parsed and processed to generate an event structure. To illustrate, for a very long, complex sentence with multiple quotes, it may be difficult to automatically identify a relevant actor and an action. In another illustrative example, a very short sentence in context of natural language dialog may be too short to automatically extract an actor and an action. Thus, such sentences may be omitted from the intent map or may be parsed and analyzed manually to be added to the intent map.

The intent map dictionary may also include data used to normalize the sentences to generate the event structures. For example, the intent map dictionary may identify intents, synonyms, word stems and roots for various terms. The intent map dictionary may identify a particular term or code that is to be within the event structures for each of the intents or synonyms. To illustrate, a sentence used to generate an event structure may be normalized by substituting terms or codes from the intent map dictionary for the actor, action, target, location, date or any combination thereof. In another illustrative example, relative date information (e.g., yesterday) from the sentence may be replace with an absolute date in the event structure. In another example, various actors, targets, locations or actions from the sentence may be identified in the event structure by a synonym or code from the intent map dictionary. Normalizing information from the documents in the event structures may simplify comparison of the event structures.

In a particular embodiment, normalizing the sentences may also include generating more than one event structure when a sentence includes two or more subjects, actions, targets, locations or dates. For example, when a sentence includes two subjects, e.g., a first actor and a second actor, that performed an action directed toward a target, two event structures may be generated. That is, a first event structure may be generated indicating that the first actor performed the action relative to the target, and a second event structure may be generated indicating that the second actor performed the action relative to the target. In another example, when the intent map dictionary associates the first and second actors with a group, one event structure may be generated to indicate that the group performed the action relative to the target.

The method may also include, at 204, performing a comparison of at least one event structure of the first intent map and at least one event structure of the second intent map. For example, a first event structure of the first intent map may be compared to a second event structure of the second intent map. The comparison may include comparing actors, intents, actions, targets, locations, dates, other data of the event structures, or any combination thereof. The comparison may determine whether the first event structure and the second event structure are the same or whether the first event structure and the second event structure are related to or descriptive of the same event.

In a particular embodiment, the method includes, at 206, determining whether at least a portion of the first document is duplicative of at least a portion of the second document based on the comparison. For example, when a number of the event structures of the first intent map match event structures from the second intent map, at least a portion of the first intent map and the second intent map may be determined to be duplicative. In a particular embodiment, two documents or portions of documents are duplicative when one document used the other as a source or when both documents had a common source.

In a particular embodiment, the method includes, at 208, determining based on the comparison whether a threshold number of events of the first intent map are similar to events of the second intent map. Portions of the first document and the second document may be determined to be duplicative when at least the threshold number of the events of the first intent map are determined to be similar to events of the second intent map. The threshold number of the events may be selected based on a tuning process. For example, the tuning process may use a set of tuning documents. A relationship of each document of the set of tuning documents may be known. That is, it may be known in advance whether each document of the set of tuning documents is duplicative of one or more other documents of the set of tuning documents. The set of tuning documents may be processed to select the threshold number of events that provides the most accurate assessment of the set of tuning documents. To illustrate, the set of tuning documents may be processed using various threshold numbers. A threshold number that most accurately identifies the known relationship of the documents is selected as the threshold number.

In a particular embodiment, the method includes, at 210, identifying a unique set of event structures corresponding to the plurality of documents. For example, identifying the unique set of event structures may include, at 212, comparing each intent map of the plurality of intent maps to each other intent map of the plurality of intent maps. In a particular illustrative embodiment, identifying the unique set of event structures may include, at 214, applying a weighting factor to a particular event structure based on where subject matter of the particular event structure is described in the document that corresponds to the particular event structure. In this embodiment, the comparison may be a weighted comparison of the event structures of the first intent map and the second intent map. For example, a first weighting factor may be applied to a particular event structure when the subject matter of the particular event structure is from a quote within the corresponding document and a second weighting factor may be applied to the particular event structure when the subject matter of the particular event structure is not from a quote within the corresponding document. Thus, the weighted comparison may weight quotes differently than non-quotes to determine whether portions of two intent maps match. To illustrate, quoted subject matter of two documents that are being compared may be weighted more heavily than non-quoted subject matter of the documents for purposes of determining whether the documents are duplicative. In another example, a first weighting factor may be applied to the particular event structure when the subject matter of the particular event structure is from a heading portion of the corresponding document and a second weighting factor may be applied when the subject matter of the particular event structure is from a body portion of the corresponding document. Thus, the weighted comparison may weight titles or headings differently than a body of the document to determine whether portions of two intent maps match. For example, headings of two documents that are being compared may be weighted less heavily than the bodies of the documents for purposes of determining whether the documents are duplicative.

In a particular embodiment, the method includes, at 216, storing one or more data records indentifying event structures of the unique set of event structures. For example, event structures that are unique may be stored at a memory location or a data structure reserved for unique event structures (e.g., a table of unique event structures). In another example, a flag or other data may be associated with each event structure. The flag or other data of particular event structures may be modified to indicate that the particular event structures are duplicative or non-duplicative.

After identifying a unique set of event structures, the method may include, at 218, generating a third intent map corresponding to a third document. The third intent map may be generated in the same manner as the first and second intent maps. The method may also include, at 220, comparing at least one event structure of the third intent map to the unique set of event structures to determine whether the at least one event structure of the third intent map is unique. Thus, rather than comparing the third intent map to each of the plurality of intent maps, the third intent map may only be compared to the unique set of event structures to determine whether one or more events structures of the third intent map is unique. When at least one event structure of the third intent map is determined to be unique, the method may include, at 222, adding at least one event structure to the set of unique event structures. The set of unique event structures may be provided for further analysis by an automated information fusion and analysis tool or by a human analyst, which may reduce processing of duplicate information.

Accordingly, the method illustrated in FIG. 2 may be capable of automatically determining uniqueness of documents and events with high confidence. Automating determination of uniqueness of documents may improve efficiency, accuracy, or both, of human or automated analysts. Additionally, automated determination of uniqueness may enable output of automated information fusion and analysis tools to be more reliable without human intervention (e.g., without screening for situations where evidence is weighted incorrectly). To illustrate, automated determination of uniqueness may catch or prevent duplicative information from being weighted too heavily.

Figure 3:
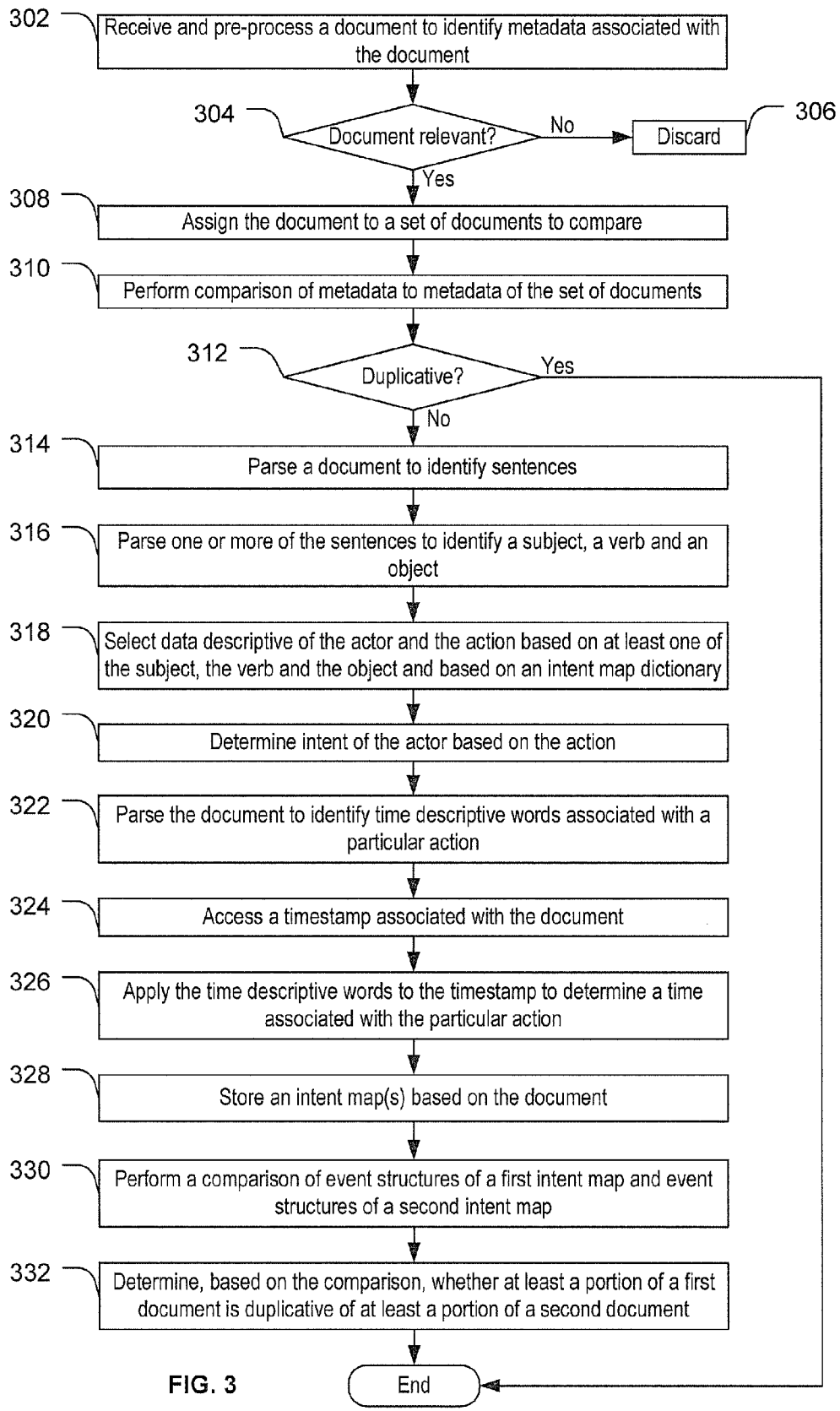
FIG. 3 is a flow diagram of a third particular embodiment of a method of analyzing documents.

FIG. 3 is a flow diagram of a third particular embodiment of a method of analyzing documents. The method includes, at 302, receiving and pre-processing a document to identify metadata associated with the document. For example, the document may be received electronically (e.g., automatically from a news feed, an automated search application, or another electronic source) and may be pre-processed to identify information related to the document, i.e., metadata. The metadata may specify a title, an author (e.g., a byline), a publication date (e.g., a dateline), a publisher or other source of the document, tags or keywords associated with the document, a location associated with the author, publisher or source of the document, other information related to the document, or any combination thereof. The metadata may be compared to a set of processing criteria to determine whether to process the document further. For example, the processing criteria may include information that is used to identify documents that are of interest. To illustrate, the processing criteria may include a list of tags or keywords that are of interest, a list of authors, publishers or document sources that are of interest, a list of terms that may be present in the title of documents that are of interests, dates of interest, other criteria used to identify documents of interest, or any combination thereof.

The method may also include, at 304, determining whether the document is of interest based on the metadata and the processing criteria. For example, when tags or a title in the metadata includes a threshold number of terms of interest, the document may be determined to be relevant. In another example, when the tags or the title includes a particular term or set of terms, the document may be determined to be not relevant. In still another example, the document may be determined to be relevant if a publication date of the document falls within a specified date range of the processing criteria, and the document may be determined to be not relevant if the publication date of the document falls outside the specified date range of the processing criteria. When the document is determined to be not relevant, the document may be discarded or removed from further processing, at 306.

When the document is determined to be relevant, at 304, the document may be assigned to a set of documents for comparison, at 308. For example, the set of documents may include other documents that satisfy the processing criteria. To illustrate, a plurality of sets of processing criteria may be established. Each of the sets of processing criteria may be related to subject matter that is of interest. When the received document satisfies a particular set of processing criteria, the received document may be assigned to a set of documents for comparison, where each of the documents in the set of documents satisfies the same set of processing criteria as the received document. The received document may be assigned to more than one set of documents when the received document satisfies more than one set of processing criteria.

The method may also include, at 310, performing a comparison of the metadata of the received document and metadata of one or more documents of the set of documents. For example, the titles, dates, authors, tags or keywords, publishers, locations, or other metadata of the received document and one or more documents of the set of documents may be compared. Based on the comparison, a determination may be made whether the metadata of the received document is substantially duplicative of the metadata of one or more of the documents of the set of documents, at 312. The determination may be based on which portions of the metadata match, how much of the metadata matches, how closely the metadata matches, or any combination thereof. For example, the metadata may be considered substantially duplicative when the titles, authors and publication dates match, even if other portions of the metadata do not match. In another example, the metadata may be considered substantially duplicative when one or more other elements of the metadata match or fall within predefined thresholds. To illustrate, the metadata may be considered substantially duplicative when the titles and authors match and the publication dates differ by no more than one day. In another illustration, the metadata may be considered substantially duplicative when the titles match, no author is present in one of the sets of metadata being compared, and a predetermined percentage of the tags or keywords match.

When the metadata of the received document is substantially duplicative of metadata of a document of the set of documents, the method may terminate. Data may be stored to indicate that the received document is duplicative. When the metadata of the received document is not substantially duplicative of metadata of a document of the set of documents, the method includes, at 314, parsing the document to identify sentences. The method may also include, at 316, parsing one or more of the sentences to identify a subject, a verb and an object. The method may also include, at 318, selecting data descriptive of an actor and an action based on at least one of the subject, the verb and the object and based on an intent map dictionary. The data descriptive of the actor and the action may be stored as an event structure of an intent map associated with the document.

In a particular embodiment, the method includes, at 320, determining intent of the actor based on the action. The intent may be a term or code that is associated with a set of one or more actions. Each action associated with a particular intent may have the same meaning or a similar meaning to each other action associated with the particular intent. For example, two actions associated with the same intent may be synonyms. In another example, two actions associated with the same intent may have a similar meaning, e.g., one action associated with a particular intent may be a subset of another action associated with the particular intent. Data descriptive of the intent may be stored in the event structure in addition to or instead of the action.

In a particular embodiment, one or more event structures may include data descriptive of a time associated with the action. In a particular embodiment, the time is estimated based on metadata associated with the document, text of the document, other information, or any combination thereof. For example, the method may include, at 322, parsing the document to identify time descriptive words associated with the action or the intent. The time descriptive words may be absolute, e.g., specifying a particular date or time, or the time descriptive words may be relative, e.g., specifying a date or time relative to another date or time. To illustrate, the time descriptive words may specify noon Central Standard Time on Dec. 1, 2009 as an absolute time. In another illustrative example, the time descriptive words may specify "noon yesterday" as a relative time. The method may include determining, estimating or assigning an absolute time to an event structure when possible. Thus, an absolute time indicated by a relative time may be determined, estimated or assigned based on data available within the document or based on metadata associated with the document. For example, a particular sentence that includes the action may also specify a time or date of the action. In another example, another sentence of the document may specify the time or date of the action. In yet another example, the metadata associated with the document (e.g., a time or date that the document was generated or accessed) may specify the time or date of the action. In a particular embodiment, the method includes, at 324, accessing a timestamp associated with the document. At 326, the time descriptive words may be applied to the timestamp to determine the absolute time associated with the particular action. For example, when the document is a news article with a dateline indicating that the article was published Dec. 2, 2009 and a sentence says that an action occurred "yesterday," the relative time "yesterday" may be applied to the timestamp in the byline to determine an absolute time of Dec. 1, 2009 associated with the action.

The method may include, at 328, storing an intent map based on the document. The intent map may include one or more event structures that specify an actor and an action (or an intent based on the action). The one or more event structures may also include data specifying a target of the action, a date or time of the action, a location, other information (e.g., data indicating whether the event structure is unique), or any combination thereof.

The method may also include, at 330, performing a comparison of event structures of the intent map to event structures of a second intent map corresponding to a second document. For example, a first event structure of the first intent map may be compared to a second event structure of the second intent map. The comparison may include comparing actors, actions, intents, targets, locations, dates, other data of the event structures, or any combination thereof. The comparison may determine whether the first event structure and the second event structure are the same or are related to or descriptive of the same event.

The method may also include, at 332, determining whether at least a portion of the first document is duplicative of at least a portion of the second document based on the comparison. For example, when a number of event structures from the first intent map match event structures from the second intent map, at least a portion of the first intent map and the second intent map may be determined to be duplicative.

Accordingly, the method illustrated in FIG. 3 may be capable of automatically determining uniqueness of documents and events with high confidence. Automating determination of uniqueness of documents may improve efficiency, accuracy, or both, of human or automated analysts. Additionally, automated determination of uniqueness may enable output of automated information fusion and analysis tools to be more reliable without human intervention (e.g., without screening for situations where evidence is weighted incorrectly). To illustrate, automated determination of uniqueness may catch or prevent duplicative information from being weighted too heavily. Further, when intents expressed with the documents are used, duplicate documents can be identified even when word-for-word comparisons of the documents would not indicate that they are duplicates. For example, when a first document has been republished as a second document with only minor edits to change one or more verbs to similar verbs, the intent expressed by the second document may be the same as the intent expressed by the first document. Thus, the first and second documents may be identified as duplicative. Additionally, pre-processing received documents by analyzing metadata of the documents can reduce a number of intent maps that are generated, which may increase efficiency, throughput, or both, of a document analysis system.

Figure 4:
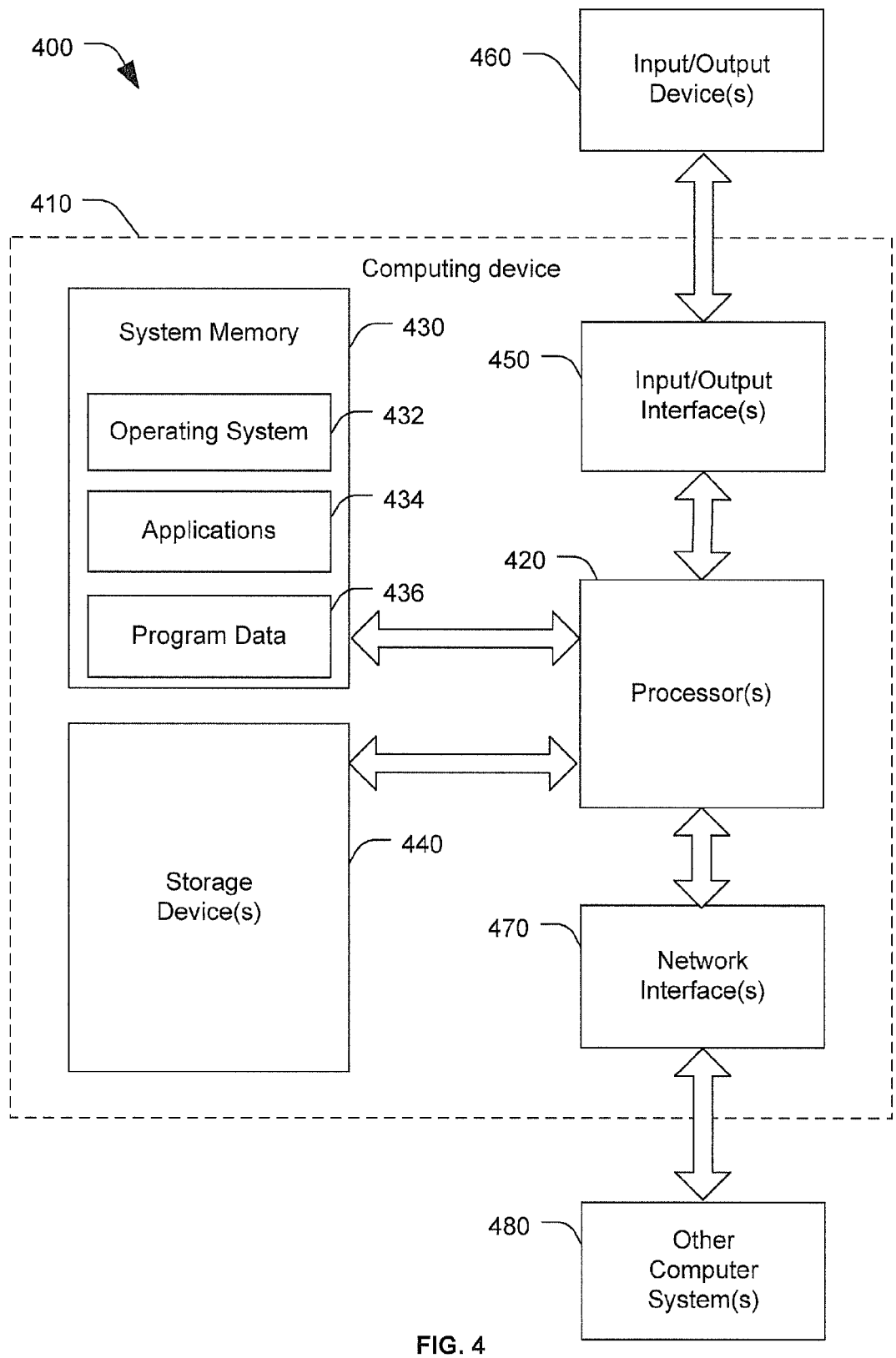
FIG. 4 is a block diagram of a general purpose computer system operable to implement embodiments of computer-implemented methods and computer-executable program instructions to analyze documents.

FIG. 4 is a block diagram of a general purpose computer system operable to implement embodiments of computer-implemented methods and computer-executable program instructions to analyze documents as described with reference to FIGS. 1-3. The general purpose computer system 400 includes a computing device 410 that includes at least one processor 420. The processor 420 can communicate with a system memory 430, one or more storage devices 440, one or more input/output devices 460, and one or more network interfaces 470 through which the computing device 410 communicates with one or more other computer systems 480.

The system memory 430 may include volatile memory devices, such as random access memory (RAM) devices and nonvolatile memory devices such as read-only memory (ROM), programmable read-only memory, and flash memory. The system memory 430 typically includes an operating system 432, which may include a basic/input output system (BIOS) for booting the computing device 410 as well as a full operating system to enable the computing device 410 to interact with users, other programs, and other computer systems 480. The system memory 430 also typically includes one or more application programs 434, such as programs including instructions that are executable to analyze documents. The system memory 430 also may include program data 436, such as data of documents to be analyzed, analysis parameters (e.g., a match threshold, an intent map dictionary, etc.), or any combination thereof.

The storage devices 440 may include removable storage devices, such as magnetic disks, optical disks, or flash memory devices. The storage devices 440 also may include non-removable storage devices, such as one or more of magnetic disks and or other nonvolatile memory devices.

The processor 420 communicates via one or more input/output interfaces 450 with the one or more input/output devices 460 that enable the computing device 410 to interact with a user. The input/output devices 460 may include keyboards, pointing devices, microphones, speakers, displays, other input/output devices or any combination thereof.

Not all of the components or devices illustrated in FIG. 4 or otherwise described in the previous paragraphs are necessary to support implementations of the present disclosure. For example, a suitable computing device 410 may include an integrated system memory and storage device including a flash memory configured to store all programs and data for operation of a system. In addition, if all input and output is communicated via the network interfaces 470, the computing device 410 may not include the input/output interfaces 450, the input/output devices 460, or both. Additionally, while the general purpose computer system 400 is illustrated as including only one computer system, in certain embodiments, the general purpose computer system 400 may include more than one computing device. For example, the general purpose computer system 400 may include a plurality of computing devices configured to work together to perform one or more of the computer-implemented methods described herein.

Embodiments disclosed herein may be used with automated information fusion and analysis tools and methods to enable accurate identification of similar and dissimilar documents. For example, particular embodiments may be capable of automatically determining uniqueness of documents and events with high confidence. Automating determination of uniqueness of documents may enable human or automated analysts to perform significantly more work for the same time and cost. Additionally, automated determination of uniqueness may enable output of automated information fusion and analysis tools to be more reliable without human intervention (e.g., without screening for situations where evidence is weighted incorrectly). To illustrate, automated determination of uniqueness may catch or prevent duplicative information from being weighted too heavily. As another example, automated determination of uniqueness using intent maps may reduce the likelihood of evidence against a proposition from being considered as support for the proposition based on occurrence of similar keywords, as could happen if a word for word comparison is used to determine uniqueness.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A computer-implemented method, comprising:
generating a plurality of intent maps representing event structures based on sentences included in a plurality of documents, including a first intent map corresponding to a first document and a second intent map corresponding to a second document, wherein generating an intent map for a selected document includes:
parsing the selected document to identify one or more sentences included in the selected document; and
extracting an event structure from at least one sentence of the one or more sentences, wherein the event structure includes data descriptive of an actor and an action described in the at least one sentence;
performing a comparison of at least one event structure of the first intent map and at least one event structure of the second intent map; and
determining, based on the comparison, whether at least a portion of the first document is duplicative of at least a portion of the second document.

2. The computer-implemented method of claim 1, further comprising identifying a unique set of event structures corresponding to the plurality of documents.

3. The computer-implemented method of claim 2, wherein the unique set of event structures is identified by comparing each intent map of the plurality of intent maps to each other intent map of the plurality of intent maps.

4. The computer-implemented method of claim 2, further comprising storing one or more data records identifying event structures of the unique set of event structures.

5. The computer-implemented method of claim 2, further comprising:
generating a third intent map corresponding to a third document;
comparing at least one event structure of the third intent map to the unique set of event structures to determine whether the at least one event structure of the third intent map is unique; and
when the at least one event structure of the third intent map is determined to be unique, adding the at least one event structure to the set of unique event structures.

6. The computer-implemented method of claim 1, wherein the actor comprises a party performing the action.

7. The computer-implemented method of claim 1, wherein one or more of the event structures include data descriptive of a target of the action described in the document that corresponds to the intent map.

8. The computer-implemented method of claim 1, wherein one or more of the event structures include data descriptive of a time associated with the action.

9. The computer-implemented method of claim 8, wherein the time is estimated based on metadata associated with the document.

10. The computer-implemented method of claim 8, wherein the time is determined based on text of the document.

11. The computer-implemented method of claim 1, further comprising applying a weighting factor to a particular event structure based on where subject matter of the particular event structure is described in the document that corresponds to the particular event structure, wherein the comparison includes a weighted comparison of the event structures of the first intent map and the second intent map.

12. The computer-implemented method of claim 11, wherein a first weighting factor is applied when the subject matter of the particular event structure is from a quote within the corresponding document and a second weighting factor is applied when the subject matter of the particular event structure is not from a quote within the corresponding document.

13. The computer-implemented method of claim 11, wherein a first weighting factor is applied when the subject matter of the particular event structure is from a heading portion of the corresponding document and a second weighting factor is applied when the subject matter of the particular event structure is from a body portion of the corresponding document.

14. The computer-implemented method of claim 1, further comprising determining based on the comparison whether a threshold number of the event structures of the first intent map are similar to event structures of the second intent map, wherein the portion of the first document and the portion of the second document are determined to be duplicative when at least the threshold number of the event structures of the first intent map are determined to be similar to event structures of the second intent map.

15. A computer-readable storage medium, comprising:
instructions that, when executed by a processor, cause the processor to generate a plurality of intent maps representing event structures based on sentences included in a plurality of documents, the plurality of intent maps including a first intent map corresponding to a first document and a second intent map corresponding to a second document, wherein generating an intent map for a selected document includes:
parsing the selected document to identify one or more sentences included in the selected document; and
extracting an event structure from at least one sentence of the one or more sentences, wherein the event structure includes data descriptive of an actor and an action described in the at least one sentence;
instructions that, when executed by the processor, cause the processor to perform a comparison of event structures of the first intent map and event structures of the second intent map; and
instructions that, when executed by the processor, cause the processor to determine, based on the comparison, whether at least a portion of the first document is duplicative of at least a portion of the second document.

16. The computer-readable storage medium of claim 15, wherein generating the first intent map includes:
parsing the first document to identify sentences;

parsing one or more of the sentences to identify a subject, a verb and an object; and selecting the data descriptive of the actor and the action based on at least one of the subject, the verb and the object and based on an intent map dictionary.

17. The computer-readable storage medium of claim 15, further comprising instructions that, when executed by the processor, cause the processor to:

identify a unique set of event structures corresponding to the plurality of documents; and store one or more data records indentifying event structures of the unique set of event structures.

18. A system, comprising:

a processor; and a memory device accessible to the processor, wherein the memory device includes instructions that, when executed by the processor, cause the processor to:

generate a plurality of intent maps representing event structures based on sentences included in a plurality of documents, the plurality of intent maps including a first intent map corresponding to a first document and a second intent map corresponding to a second document, wherein the instructions that cause the processor to generate the plurality of intent maps cause the processor to:

parse a selected document to identify one or more sentences included in the selected document; and extract an event structure from at least one sentence of the one or more sentences, wherein the event structure includes data descriptive of an actor and an action described in the at least one sentence;

perform a comparison of event structures of the first intent map and event structures of the second intent map; and determine, based on the comparison, whether at least a portion of the first document is duplicative of at least a portion of the second document.

19. The system claim 18, further comprising instructions that, when executed by the processor, cause the processor to:

parse the first document to identify time descriptive words associated with a particular action;

access a timestamp associated with the first document; and apply the time descriptive words to the timestamp to determine a time associated with the particular action.

20. The system claim 18, further comprising instructions that, when executed by the processor, cause the processor to identify a unique set of event structures corresponding to the plurality of documents by comparing each intent map of the plurality of intent maps to each other intent map of the plurality of intent maps.

\* \* \* \* \*